(12) United States Patent
Mori et al.

(10) Patent No.: US 8,919,184 B2
(45) Date of Patent: Dec. 30, 2014

(54) LEAK TESTING METHOD AND LEAK TESTING DEVICE FOR IODINE FILTER

(75) Inventors: Norihisa Mori, Tokyo (JP); Naoyuki Kamishima, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 273 days.

(21) Appl. No.: 13/697,073

(22) PCT Filed: Apr. 25, 2011

(86) PCT No.: PCT/JP2011/060080
§ 371 (c)(1),
(2), (4) Date: Nov. 9, 2012

(87) PCT Pub. No.: WO2011/142243
PCT Pub. Date: Nov. 17, 2011

(65) Prior Publication Data
US 2013/0047707 A1    Feb. 28, 2013

(30) Foreign Application Priority Data

May 10, 2010    (JP) .................................. 2010-108638

(51) Int. Cl.
*G01M 3/04*    (2006.01)
*G21F 9/02*    (2006.01)
*B01D 53/22*    (2006.01)
*B01D 65/10*    (2006.01)
(Continued)

(52) U.S. Cl.
CPC  *G21F 9/02* (2013.01); *B01D 53/22* (2013.01); *B01D 65/104* (2013.01); *B01J 20/0233* (2013.01); *B01J 20/103* (2013.01); *B01J 20/165* (2013.01); *B01J 20/186* (2013.01); *B01J 20/20* (2013.01); *B01J 20/28045* (2013.01); *B01J 20/3204* (2013.01); *B01J 20/3236* (2013.01); *B01J 20/3248* (2013.01); *B01J 20/3007* (2013.01); *G01M 3/20* (2013.01); *B01D 2319/04* (2013.01)

USPC ......................................................... 73/40.7

(58) Field of Classification Search
USPC ......................................................... 73/40.7
See application file for complete search history.

(56) References Cited

FOREIGN PATENT DOCUMENTS

JP    58-172548 A    10/1983
JP    59-12337 A    1/1984
(Continued)

OTHER PUBLICATIONS

Japanese Decision to Grant a Patent dated Jul. 15, 2014, issued in corresponding Japanese Patent Application No. 2010-108638 w/English translation (4 pages).

(Continued)

*Primary Examiner* — Hezron E Williams
*Assistant Examiner* — Rodney T Frank
(74) *Attorney, Agent, or Firm* — Westerman, Hattori, Daniels & Adrian, LLP

(57) ABSTRACT

A leak testing device for an iodine filter according to the present embodiment includes an iodine adsorption unit including an iodine filter provided in a chamber provided in a duct, to which flue gas containing radioactive iodine is fed, and including an iodine adsorbing material that adsorbs radioactive iodine contained in the flue gas, a fluorine-containing-reagent feed unit that feeds a fluorine-containing reagent that does not contain chlorine into the duct, and a first fluorine-containing-reagent-concentration measurement unit and a second fluorine-containing-reagent-concentration measurement unit that measures a concentration of the fluorine-containing reagent on an upstream side and a downstream side of the iodine filter.

7 Claims, 3 Drawing Sheets

(51) Int. Cl.
*B01J 20/02* (2006.01)
*B01J 20/10* (2006.01)
*B01J 20/16* (2006.01)
*B01J 20/18* (2006.01)
*B01J 20/20* (2006.01)
*B01J 20/28* (2006.01)
*B01J 20/32* (2006.01)
*B01J 20/30* (2006.01)
*G01M 3/20* (2006.01)

(56) References Cited

FOREIGN PATENT DOCUMENTS

| | | |
|---|---|---|
| JP | 59-126281 A | 7/1984 |
| JP | 06-222194 A | 8/1994 |
| JP | 07-148418 A | 6/1995 |
| JP | 2003-130992 A | 5/2003 |
| JP | 2010-40916 A | 2/2010 |

OTHER PUBLICATIONS

Japanese Office Action dated Apr. 30, 2014, issued in corresponding Japanese Patent Application No. 2010-108638, w/English translation (3 pages).

Written Opinion dated May 31, 2011, issued in corresponding International Application No. PCT/JP2011/060080 (3 pages).

International Search Report of PCT/JP2011/060080, date of mailing May 31, 2011. (3 pages).

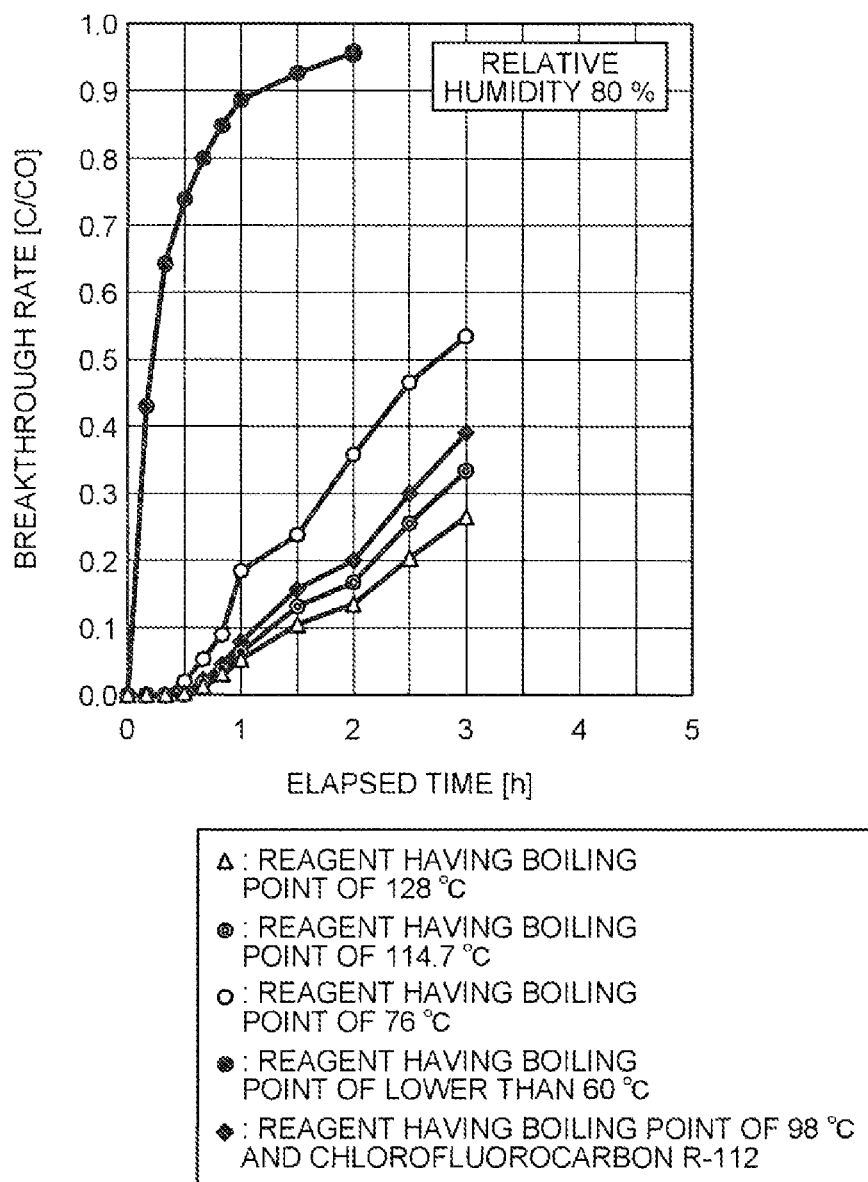

LEAK TESTING METHOD AND LEAK TESTING DEVICE FOR IODINE FILTER

FIELD

The present invention relates to a leak testing method and a leak testing device for an iodine filter used in an air-conditioning and ventilating apparatus or an off-gas treatment apparatus that removes radioactive iodine contained in flue gas generated from a nuclear facility or the like.

BACKGROUND

To prevent radiation from being released from a nuclear facility, an air-conditioning and ventilating apparatus is provided in the nuclear facility to remove radioactive iodine contained in gas. An iodine filter is provided in a chamber or the like in the air-conditioning and ventilating apparatus, and the iodine filter is accommodated in a casing in multiple stages and installed in the chamber or the like. As the iodine filter, an activated carbon filter having high removal efficiency of radioactive iodine has been conventionally used.

Generally, in such an iodine filter, removal efficiency of radioactive iodine by an activated carbon filled in the iodine filter is obtained, and a leak rate is measured in order to confirm the presence of a leakage from a minute gap, which may be generated between the iodine filter fitted in the chamber or the like and a gasket in the air-conditioning and ventilating apparatus.

When a minute gap is generated between the iodine filter and the gasket, a part of gas entering from an inlet side of the iodine filter does not pass through the iodine filter but passes through the minute gap and flows to a downstream side of the iodine filter. While passing through the gap, any gas is not collected. Therefore, an amount of gas passing though the gap and moving to the downstream side of the iodine filter depends on the size of the gap, regardless of the kind of substance of the gas.

A method of testing a leakage in the iodine filter includes a method of introducing Freon-112 (Chlorofluorocarbon R-112) into the iodine filter, and testing a concentration of Chlorofluorocarbon R-112 on an inlet side and an outlet side of the iodine filter by a gas chromatograph attached with an electron capture detector or the like, and a method of introducing non-radioactive methyl iodide into the iodine filter and testing a concentration of methyl iodide in the same manner as described above. Besides, there has been also proposed a method of introducing heavy water vapor into an iodine filter to detect a leakage (see, for example, Patent Literature 1).

CITATION LIST

Patent Literature

Patent Literature 1: Japanese Patent Application Laid-open No. 58-172548

SUMMARY

Technical Problem

However, in the case of the leak testing method using Freon-112 described above, because Freon-112 is a discontinued product because of the viewpoint of ozone depletion, there is a problem that Freon-112 cannot be used for leak testing of the iodine filter in the future.

Furthermore, in the case of the leak testing method using methyl iodide described above, an activated carbon used for the iodine filter is used for removing radioactive iodine compounds (for example, $I_2$ and $CH_3I$). However, non-radioactive methyl iodide flowing into the iodine filter is also irreversibly collected at the same time. Accordingly, there is a problem that the collection capacity of the iodine filter decreases.

Furthermore, in the case of the leak testing method using heavy water vapor, if the amount of moisture in the air is high, heavy water vapor leaks without being adsorbed by an activated carbon. Accordingly, there is a problem that accurate leak testing becomes difficult.

Therefore, a leak testing method for an iodine filter that can maintain a long breakthrough time and can easily perform a leak rate test of radioactive iodine accurately without decreasing the collection capacity of radioactive iodine has been desired.

The present invention has been achieved to solve the above problems, and an object of the present invention is to provide a leak testing method and a leak testing device for an iodine filter that have a long breakthrough time and can easily perform a leak rate test of radioactive iodine accurately without decreasing a collection capacity of radioactive iodine.

SOLUTION TO PROBLEM

In order to solve the above problems, according to a first aspect of the invention, there is provided a leak testing method for an iodine filter for detecting a leakage in an iodine filter that removes radioactive iodine contained in gas to be treated by an iodine adsorbing material, in a duct or a chamber to which the gas to be treated containing radioactive iodine discharged from a nuclear facility is fed, the leak testing method including: feeding a fluorine-containing reagent that does not contain chlorine to an upstream side of the iodine filter; measuring a concentration of the fluorine-containing reagent on the upstream side and a downstream side of the iodine filter; and obtaining a leak rate of the fluorine-containing reagent passing through the iodine filter.

According to a second aspect of the invention, there is provided the leak testing method for an iodine filter according to the first aspect, wherein a compound that contains fluorine and carbon, and further contains at least one of hydrogen, oxygen, and nitrogen, but does not contain chlorine is used as the fluorine-containing reagent.

According to a third aspect of the invention, there is provided the leak testing method for an iodine filter according to the first or second aspect, wherein the fluorine-containing reagent has a boiling point equal to or higher than 70 C under atmospheric pressure.

According to a fourth aspect of the invention, there is provided a leak testing device for an iodine filter including: an iodine filter provided in a duct or a chamber to which gas to be treated containing radioactive iodine is fed, the iodine filter including an iodine adsorbing material that adsorbs radioactive iodine contained in the gas to be treated; a fluorine-containing-reagent feed unit provided in the duct or the chamber to feed a fluorine-containing reagent that does not contain chlorine into the duct or the chamber; and a fluorine-containing-reagent-concentration measurement unit provided on an upstream side and a downstream side of the iodine filter to measure a concentration of the fluorine-containing reagent.

According to a fifth aspect of the invention, there is provided the leak testing device for an iodine filter according to the fourth aspect, wherein the fluorine-containing reagent is a compound that contains fluorine and carbon, and further contains at least one of hydrogen, oxygen, and nitrogen, but does not contain chlorine.

According to a sixth aspect of the invention, there is provided the leak testing device for an iodine filter according to the fourth or fifth aspect, wherein the fluorine-containing reagent has a boiling point equal to or higher than 70 C under atmospheric pressure.

According to a seventh aspect of the invention, there is provided the leak testing device for an iodine filter according to any one of the fourth to sixth aspects, wherein the gas to be treated is flue gas discharged from a nuclear facility.

ADVANTAGEOUS EFFECTS OF INVENTION

According to the present invention, a long breakthrough time can be maintained, and the presence of a leakage in an iodine filter can be easily detected without decreasing the collection capacity of radioactive iodine. The present invention can use a testing method similar to the conventional leak testing method using Freon-112. Therefore, it can be easily determined whether an iodine adsorbing material has broken through or an iodine filter has a leakage, and a test result regarding the presence of a leakage in the iodine filter can be acquired highly accurately. Furthermore, the present invention can further suppress a decrease in the collection capacity of the iodine filter as compared to a leak testing method using methyl iodide.

BRIEF DESCRIPTION OF DRAWINGS

FIG. 4 depicts a relation between an elapsed time and a breakthrough rate when a relative humidity is about 80%.

DESCRIPTION OF EMBODIMENTS

The present invention is explained below in detail with reference to the accompanying drawings. The present invention is not limited to the mode for carrying out the invention (hereinafter, "embodiment"). Furthermore, constituent elements in the following embodiment include those that can be easily assumed by persons skilled in the art, that are substantially equivalent, and so-called equivalents. In addition, constituent elements disclosed in the following embodiment can be combined as appropriate.

Figure 1:
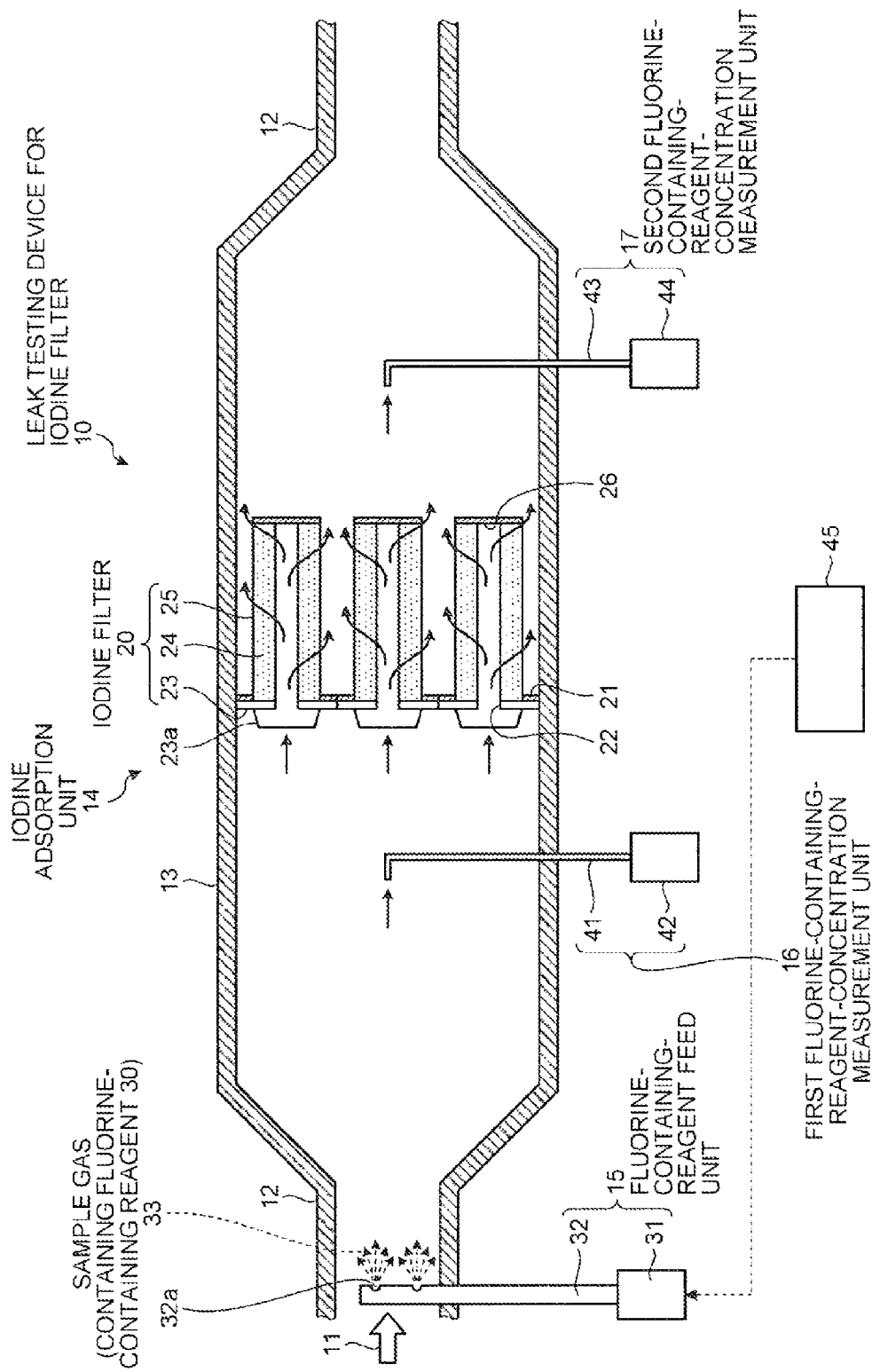
FIG. 1 is a schematic diagram of a configuration of a leak testing device for an iodine filter according to an embodiment of the present invention.

A leak testing device for an iodine filter according to an embodiment of the present invention is explained below with reference to the drawings. FIG. 1 is a schematic diagram of a configuration of the leak testing device for an iodine filter according to the embodiment of the present invention. As shown in FIG. 1, a leak testing device 10 for an iodine filter according to the present embodiment is provided in a chamber (a container) 13 provided in a duct 12, through which flue gas (gas to be treated) 11 containing radioactive iodine is fed. The leak testing device 10 for an iodine filter according to the present embodiment includes an iodine adsorption unit 14, a fluorine-containing-reagent feed unit 15, a first fluorine-containing-reagent-concentration measurement unit 16, and a second fluorine-containing-reagent-concentration measurement unit 17.

Figure 2:
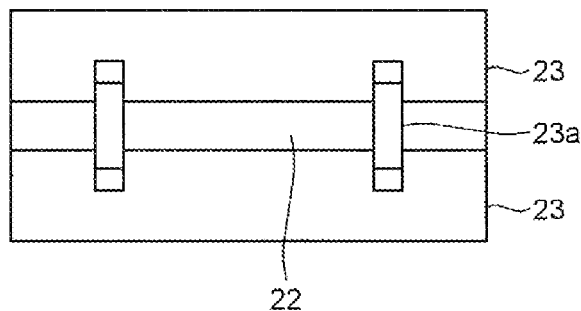
FIG. 2 is a front view of an iodine filter as viewed from a flow direction of flue gas.

The iodine adsorption unit 14 includes three iodine filters 20. The iodine filters 20 are arranged in parallel inside a gasket 21 provided in the chamber 13. The iodine filter 20 includes a pair of gas introduction units 23 respectively having a gas introduction hole 22, and a pair of filter bodies 25 that accommodate an iodine adsorbing material 24 that adsorbs radioactive iodine contained in the flue gas 11. The filter body 25 includes a plurality of holes, so that gas can pass through inside and outside of the filter body 25. FIG. 2 is a front view of the iodine filter 20 as viewed from a flow direction of the flue gas 11. As shown in FIG. 2, the gas introduction units 23 are connected to each other by a pair of coupling units 23a. A back plate 26 is provided at the other end of the filter body 25, opposite to the gas introduction unit 23. Furthermore, the iodine adsorption unit 14 is detachable from the chamber 13 so that a plurality of iodine filters 20 can be tested.

The flue gas 11 is flue gas discharged from a nuclear facility. The flue gas 11 is fed into the chamber 13 via the duct 12, passes through the gas introduction holes 22 to enter into the filter bodies 25, and after radioactive iodine in the flue gas 11 is adsorbed by the iodine adsorbing material 24, the flue gas 11 passes through the filter bodies 25 and flows to a downstream side of the iodine filters 20. The flue gas 11 having passed through the iodine adsorption unit 14 is discharged to outside of the system, in a state where the concentration of radioactive iodine in the flue gas 11 satisfies a condition of being equal to or less than an activity concentration, which does not have any problem in a radiation exposure evaluation.

The iodine adsorbing material 24 is molded in a material capable of adsorbing radioactive iodine and is filled in the iodine filter 20. The flue gas 11 passes a gap between the iodine adsorbing materials 24 and passes through the iodine filter 20. A material used as the iodine adsorbing material 24 can be any material capable of adsorbing radioactive iodine in the flue gas 11. For example, an iodine-impregnated activated carbon, a triethylene diamine (TEDA)-impregnated activated carbon, an activated carbon, or a silver-impregnated activated carbon using an activated carbon as a carrier, or silver zeolite, silver mordenite, or the like using natural zeolite or synthetic zeolite as a carrier, or silver-impregnated silver silica gel, silver alumina, or the like using another adsorbing material as a carrier can be used. The iodine adsorbing material 24 can be formed in a shape of a pellet or a briquette, or have a granular, fibrous, blanket-like, or honeycomb shape.

In the present embodiment, the iodine filter 20 is provided in the chamber 13. However, the present embodiment is not limited thereto, and one, two, or four or more iodine filters can be also provided in the chamber 13, and the number of the iodine filters 20 can be appropriately changed depending on the inner diameter of the chamber, the installation area of the iodine filter 20, and the outer diameter of the gas introduction unit 23.

The fluorine-containing-reagent feed unit 15 includes a fluorine-containing reagent reservoir 31 that retains a fluorine-containing reagent 30 that does not contain chlorine, and a fluorine-containing-reagent feed pipe 32 for feeding the fluorine-containing reagent 30 that does not contain chlorine into the duct 12. The fluorine-containing reagent 30 is fed from the fluorine-containing-reagent feed unit 15 into the duct 12 via the fluorine-containing-reagent feed pipe 32, accompanied by sample gas 33. For example, air is used as the sample gas 33. The sample gas 33 containing the fluorine-containing reagent 30 is fed from a nozzle hole 32a provided in the fluorine-containing-reagent feed pipe 32 to an upstream side of the first fluorine-containing-reagent-concentration measurement unit 16.

As the fluorine-containing reagent 30, it is desired to use a compound that contains F (fluorine) and C (carbon), and contains at least one of H (hydrogen), O (oxygen), and N (nitrogen), but does not contain Cl (chlorine). The fluorine-containing reagent 30 includes, for example, a compound expressed by a composition formula of $(C_3F_7)_3$—N, a compound expressed by a composition formula of $C_4F_9OC_2H_5$, a compound expressed by a composition formula of $C_6F_{13}OCH_3$, a compound expressed by a composition formula of $CF_3(CF_2)_5CH_2CH_3(C_3F_{13}H_5)$, and a compound expressed by a composition formula of $(CH_2CHFCF_2CF_2CF_2)$. These compounds have respectively a boiling point equal to or higher than 70 C, and therefore these compounds are favorable to be used. For example, a boiling point of the compound expressed by the composition formula of $(C_3F_7)_3$—N is about 128 C. A boiling point of the compound expressed by the composition formula of $C_4F_9OC_2H_5$ is about 76 C. A boiling point of the compound expressed by the composition formula of $C_6F_{13}OCH_3$ is about 98 C. A boiling point of the compound expressed by the composition formula of $CF_3(CF_2)_5CH_2CH_3(C_3F_{13}H_5)$ is about 114.7 C. A boiling point of the compound expressed by the composition formula of $(CH_2CHFCF_2CF_2CF_2)$ is about 82.5 C. Accordingly, the compounds exemplified above can be favorably used as the fluorine-containing reagent 30.

The first fluorine-containing-reagent-concentration measurement unit 16 and the second fluorine-containing-reagent-concentration measurement unit 17 are provided in the chamber 13, putting the iodine adsorption unit 14 therebetween. The first fluorine-containing-reagent-concentration measurement unit 16 is provided on an upstream side of the iodine filter 20, inserted into the duct 12 on an upstream side of the chamber 13, and includes a first gas sampling tube 41 that samples gas in the chamber 13 and a first gas chromatograph 42 that analyzes the sampled gas. The second fluorine-containing-reagent-concentration measurement unit 17 is provided on a downstream side of the iodine filter 20, inserted into the chamber 13, and includes a second gas sampling tube 43 that samples gas in the chamber 13 and a second gas chromatograph 44 that analyzes the sampled gas.

The fluorine-containing-reagent feed unit 15 is connected to a control device 45, and the control device 45 adjusts whether to perform spraying and a spraying amount of the fluorine-containing reagent 30. The fluorine-containing-reagent feed unit 15 includes a heating means such as an electric heater for heating the fluorine-containing reagent 30 in the form of liquid and a flow-rate control means that controls a flow rate of the sample gas 33. The control device 45 connects the heating means and the flow-rate control means with each other, to control an output (a heating electric charge) of the heating means and control the flow rate of the sample gas 33. The fluorine-containing-reagent feed unit 15 heats the liquid fluorine-containing reagent 30 by an electric heater or the like and maintains a constant flow rate of the sample gas 33, thereby evaporating the fluorine-containing reagent 30 in the sample gas 33 to maintain a predetermined concentration.

In the present embodiment, the first gas sampling tube 41 and the second gas sampling tube 43 for sampling the flue gas 11 are respectively provided one each in the chamber 13. However, the present embodiment is not limited thereto, and the first gas sampling tube 41 and the second gas sampling tube 43 can be also provided in plural in the chamber 13, and the number of any one or both of the first gas sampling tubes 41 and the second gas sampling tubes 43 can be appropriately changed, depending on the inner diameter of the chamber 13, the number of the iodine filters 20 to be installed, and the outer diameter of the gas introduction unit 23.

When a leakage from the iodine filter 20 is to be tested, the sample gas 33 containing the fluorine-containing reagent 30 is fed into the chamber 13 from the upstream side of the iodine filter 20. A part of the sample gas 33 containing the fluorine-containing reagent 30 is sampled by the first gas sampling tube 41 and fed to the first gas chromatograph 42, where the concentration of the fluorine-containing reagent 30 in the sample gas 33 is measured.

After the sample gas 33 has passed through the iodine filter 20, a part of air is sampled by the second gas sampling tube 43 on the downstream side of the iodine filter 20 and fed to the second gas chromatograph 44, where the concentration of the fluorine-containing reagent 30 remaining in the sample gas 33 is measured. Almost all the fluorine-containing reagent 30 in the sample gas 33 is adsorbed by the iodine adsorbing material 24 in the iodine filter 20. Therefore, the fluorine-containing reagent 30 is hardly detected from the sampled sample gas 33. If there is a leakage in the iodine filter 20, the sample gas 33 containing the fluorine-containing reagent 30 does not pass through the iodine adsorbing material 24, and thus the fluorine-containing reagent 30 is not adsorbed and flows to the downstream side of the iodine filter 20. Accordingly, if the fluorine-containing reagent 30 is detected from the sample gas 33 sampled by the second gas sampling tube 43 on the downstream side of the iodine filter 20, it can be confirmed that there is a leakage in the iodine filter 20.

In the present embodiment, the leakage in the iodine filter 20 means that when the flue gas 11 passes through the iodine adsorbing material 24, the flue gas 11 passes through the gap between the iodine filter 20 and the gasket 21, and radioactive iodine in the flue gas 11 is not removed by the iodine adsorbing material 24. Because the fluorine-containing reagent 30 exhibits the same behavior as that of radioactive iodine, if there is a leakage in the iodine filter 20, the fluorine-containing reagent 30 in the sample gas 33 passes through the gap between the iodine filter 20 and the gasket 21.

It is desired that the fluorine-containing reagent 30 has a boiling point equal to or higher than 70 C under atmospheric pressure. If the boiling point of the fluorine-containing reagent 30 under atmospheric pressure is lower than 70 C, moisture contained in the sample gas 33 is adsorbed by the iodine adsorbing material 24 prior to the fluorine-containing reagent 30, and thus the fluorine-containing reagent 30 is hardly adsorbed by the iodine adsorbing material 24. In this case, the breakthrough time of the fluorine-containing reagent 30 becomes extremely short due to the moisture already adsorbed by the iodine adsorbing material 24, thereby making it difficult or unable to perform leak testing of the iodine filter 20.

Figure 3:
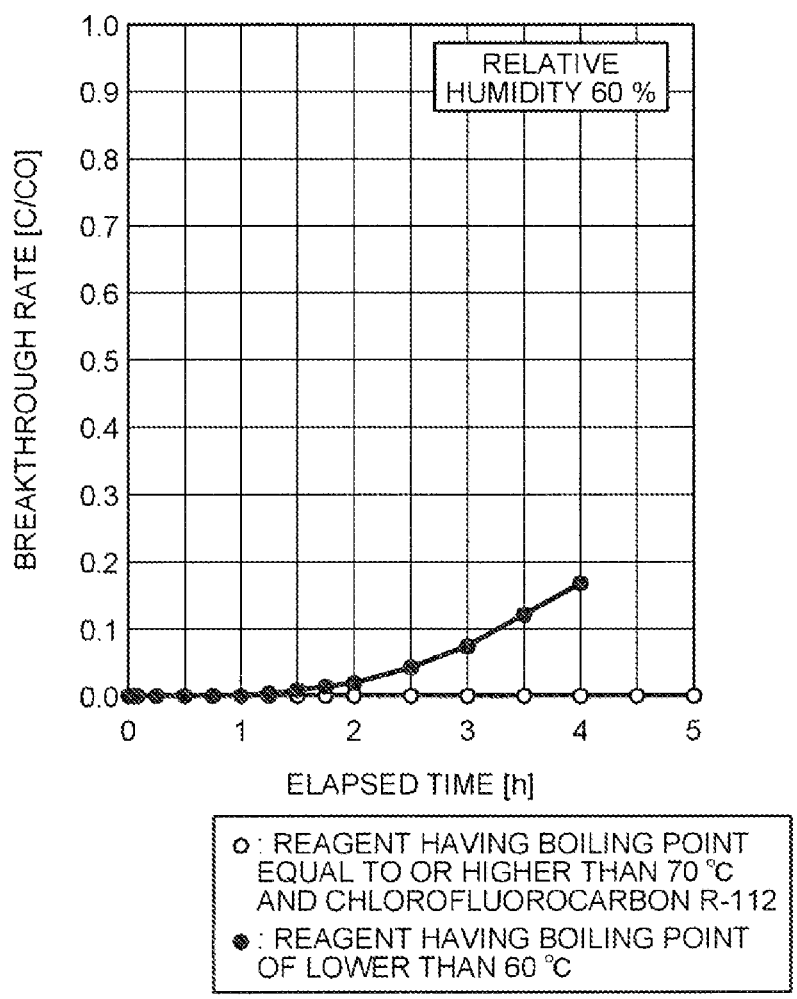
FIG. 3 depicts a relation between an elapsed time and a breakthrough rate when a relative humidity is about 60%.

FIG. 3 depicts a relation between an elapsed time and a breakthrough rate when a relative humidity is about 60%, and FIG. 4 depicts a relation between an elapsed time and a breakthrough rate when a relative humidity is about 80%. As shown in FIG. 3, when the relative humidity in the sample gas 33 was about 60%, even if the fluorine-containing reagent 30 having a boiling point of lower than 60 C was used, the breakthrough rate of the iodine adsorbing material 24 was maintained to be substantially zero for about 1.5 hours (filled circles in FIG. 3). When the fluorine-containing reagent 30 having a boiling point equal to or higher than 70 C was used, the breakthrough rate of the iodine adsorbing material 24 was maintained to be substantially zero for at least 5 hours (open circles in FIG. 3). Furthermore, regarding Chlorofluorocarbon R-112 conventionally used for the leak testing of radioactive iodine of the iodine filter, the breakthrough rate of the iodine adsorbing material 24 was maintained to be substantially zero for at least 5 hours (open circles in FIG. 3), as in the case of using the fluorine-containing reagent 30 having a boiling point equal to or higher than 70 C. Accordingly, when the relative humidity in the sample gas 33 is about 60%, the fluorine-containing reagent 30 having a boiling point equal to or higher than 70 C can be favorably used for the leak testing of the iodine filter 20.

On the other hand, as shown in FIG. 4, when the relative humidity in the sample gas 33 was about 80%, if the fluorine-containing reagent 30 having a boiling point of lower than 60 C was used, the iodine adsorbing material 24 was broken through substantially immediately after start of testing (filled circles in FIG. 4). Therefore, it was difficult to discriminate whether the fluorine-containing reagent 30 leaked from the iodine filter 20 was attributable to the fluorine-containing reagent 30 leaked from the gap between the iodine filter 20 and the gasket 21 or attributable to the breakthrough of the iodine adsorbing material 24. Accordingly, it was difficult to acquire an accurate measurement value of the fluorine-containing reagent 30 leaked from the gap between the iodine filter 20 and the gasket 21. On the other hand, when a fluorine-containing reagent 30 having a boiling point of 76 C, a fluorine-containing reagent 30 having a boiling point of 98 C, a fluorine-containing reagent 30 having a boiling point of 114.7 C, and a fluorine-containing reagent 30 having a boiling point of 128 C were used as the fluorine-containing reagent 30 having a boiling point equal to or higher than 70 C, even if the relative humidity was about 80%, any breakthrough of the iodine adsorbing material 24 did not occur for about 30 minutes after start of testing (open circles, double circles, open triangles, and filled squares in FIG. 4). Chlorofluorocarbon R-112 also exhibited the same behavior as in cases of using the fluorine-containing reagents 30 having a boiling point of 76 C, 98 C, 114.7 C, and 128 C, and any breakthrough of the iodine adsorbing material 24 did not occur for about 30 minutes after start of testing (filled squares in FIG. 4). Consequently, even if the relative humidity in the sample gas 33 is about 80%, if the fluorine-containing reagent 30 having a boiling point equal to or higher than 70 C is used, the leak rate of the iodine filter 20 can be measured without causing any breakthrough of the iodine adsorbing material 24, for a sufficient time for performing the leak testing of the iodine filter 20.

In the fluorine-containing reagent 30 adsorbed by the iodine filter 20 in the leak testing of the iodine filter 20, most parts thereof are adsorbed by the iodine filter 20. However, the fluorine-containing reagent 30 adsorbed by the iodine filter 20 is in an amount considerably smaller than an amount that decreases the collection capacity of methyl iodide of the iodine filter 20. Accordingly, it does not cause any influence on the removal performance of radioactive iodine of the iodine filter 20.

(Evaluation Method of Leak Rate of Iodine Filter)

An evaluation method of the leak rate of the iodine filter 20 performed by using the leak testing device 10 for an iodine filter according to the present embodiment is specifically explained below. The sample gas 33 containing the fluorine-containing reagent 30 is sprayed into the chamber 13 from the nozzle hole 32a of the fluorine-containing-reagent feed pipe 32, to introduce the fluorine-containing reagent 30 into the upstream side of the iodine filter 20 for several minutes. The sample gas 33 containing the fluorine-containing reagent 30 is sampled from the first gas sampling tube 41 and the second gas sampling tube 43, respectively, on the upstream side and the downstream side of the iodine filter 20. The fluorine-containing reagent 30 is contained as moisture in the sample gas 33, and the sampled fluorine-containing reagent 30 is measured by the first gas chromatograph 42 and the second gas chromatograph 44, to obtain the leak rate of the iodine filter 20 according to the following equation (1). In the following equation (1), A denotes a concentration of the fluorine-containing reagent 30 on the downstream side of the iodine filter 20, B denotes a concentration of the fluorine-containing reagent 30 on the upstream side of the iodine filter 20, C denotes a detection limit the concentration of the second gas chromatograph 44 on the downstream side of the iodine filter 20, and D denotes a detection limit concentration of the first gas chromatograph 42 on the upstream side of the iodine filter 20.

$$\text{Leak rate (\%)} = (A-C)/(B-D)100 \qquad (1)$$

A criterion for the determination of the iodine filter 20 is such that the leak rate is 1% or less in a case of a pressurized water reactor (PWR). The detection limit concentration of the fluorine-containing reagent 30 in the sample gas 33 by the first gas chromatograph 42 and the second gas chromatograph 44 is about 10 $10^{-9}$ (10 parts per billion). At this time, for example, if it is assumed that the iodine adsorption unit 14 including the three iodine filters 20 has a processing capacity of the sample gas 33 of 1000 $m^3$/h, the concentration of the fluorine-containing reagent 30 in the sample gas 33 is set to 30 $10^{-6}$ (30 parts per million) by injecting the fluorine-containing reagent 30 from the upstream side of the iodine filter 20, and the concentration of the fluorine-containing reagent 30 of 30 $10^{-9}$ (30 parts per billion) has been detected on the downstream side of the iodine filter 20, the leak rate of the iodine filter 20 can be obtained as about 0.07% from the above equation (1). An example of the criterion for the determination of the leak rate in order to set the activity concentration, which does not have any problem in a radiation exposure evaluation, is 1.0%. In the case of this criterion for the determination, the leak rate of 0.07% acquired in the leak testing described above can be determined to satisfy the criterion for the determination of the leak rate. The fluorine-containing reagent 30 exhibits the same leakage behavior as that of the radioactive iodine as described above, and thus the value of leak testing using the fluorine-containing reagent 30 can be handled as the leak rate of the radioactive iodine.

Accordingly, because the fluorine-containing reagent 30 is collected by the iodine adsorbing material 24 highly efficiently as in conventionally used Chlorofluorocarbon R-112, the leak rate of the fluorine-containing reagent 30 largely changes depending on the presence of a gap between the iodine filter 20 and the gasket 21, which may be generated at the time of providing the iodine filter 20 in the gasket 21. The leakage behavior of the fluorine-containing reagent 30 is similar to that when radioactive iodine passes through the iodine adsorbing material 24 and the gap between the iodine filter 20 and the gasket 21. Accordingly, the presence of a leakage from the iodine filter 20 when radioactive iodine passes through the iodine filter 20 can be indirectly tested based on the behavior when the fluorine-containing reagent 30 passes through the iodine filter 20.

When it is determined that there is no leakage in the iodine filter 20 or the leak rate is equal to or lower than a predetermined reference value (for example, 1.0%) by the leak testing device 10 for an iodine filter according to the present embodiment, the iodine filter 20 can be directly used for processing radioactive iodine contained in the flue gas 11 discharged from the nuclear facility. Furthermore, when a leakage is detected in the iodine filter 20, a new iodine filter 20 is refilled in the gasket 21 or the gap between the iodine filter 20 and the gasket 21 is filled. In this case, the presence of a leakage in the iodine filter 20 is determined again by the leak testing device 10 for an iodine filter according to the present embodiment in the same manner as described above.

As described above, according to the leak testing device 10 for an iodine filter of the present embodiment, the breakthrough time is long, and the leak rate of radioactive iodine can be tested accurately and easily without decreasing the collection capacity of radioactive iodine. Accordingly, the same testing method as the conventional leak testing method using Freon-112 can be used, and a determination whether the iodine adsorbing material 24 is broken through or the iodine filter 20 has a leakage can be easily performed, thereby enabling to acquire a test result regarding the presence of a leakage in the iodine filter highly accurately. Furthermore, a decrease in the collection capacity of the iodine filter 20 can be suppressed further as compared to the leak testing method using methyl iodide. Leak testing of the iodine filter 20 before being fitted in the chamber 13 and leak testing of the iodine filter 20 after being fitted in the chamber 13 can be both performed easily. Further, differently from the leak testing method using heavy water vapor, the environment is not contaminated and handling is easy.

In the present embodiment, a leak testing method for the iodine filter 20 by using the leak testing device 10 for an iodine filter according to the present embodiment has been explained. However, the present embodiment is not limited thereto, and is also applicable to filters other than the iodine filter 20.

In the leak testing device for an iodine filter 10 according to the present embodiment, one iodine adsorption unit 14 is provided in the chamber 13. However, the present embodiment is not limited thereto. For example, a plurality of iodine adsorption units 14 can be provided depending on the distance from an inlet port to an outlet port of the chamber 13, the installation area of the iodine adsorption unit 14, and the like.

A case where the leak testing device 10 for an iodine filter according to the present embodiment has only one duct 12 has been explained above. However, the present invention is not limited thereto. When a plurality of ducts 12 having the chamber 13 are provided, the flue gas 11 can be fed alternately to the ducts 12, so that leak testing of the iodine filter 20 in each chamber 13 can be performed while operating a nuclear facility. The chamber 13 including the iodine adsorption unit 14 is provided for each duct 12, and while the leak testing of the iodine filter 20 is performed in one chamber 13, feed of the flue gas 11 to one duct 12 is stopped and the flue gas 11 is fed to the other duct 12, so that the iodine filter 20 in the one chamber 13 can be replaced or the gap between the iodine filter 20 and the gasket 21 can be filled. Accordingly, leak testing of the iodine filter 20 can be performed without shutting down the nuclear facility, and a leakage of radioactive iodine to outside can be prevented reliably by causing radioactive iodine in the flue gas 11 to be adsorbed continuously and stably by the iodine filter 20.

In the leak testing device 10 for an iodine filter according to the present embodiment, the iodine filter 20 is provided in the chamber 13. However, the present invention is not limited thereto, and the iodine filter 20 can be also provided in the duct 12 other than in the chamber 13.

In the leak testing device 10 for an iodine filter according to the present embodiment, it has been explained that the flue gas 11 containing radioactive iodine discharged from the nuclear facility such as a nuclear power plant is targeted. However, the present embodiment is not limited thereto, and is also applicable to flue gas or the like containing radioactive iodine discharged from a factory or the like other than the nuclear facility, such as a reprocessing plant and a radioisotope handling facility.

In the leak testing device 10 for an iodine filter according to the present embodiment, a case where the leak testing device 10 for an iodine filter is used for testing the presence of a leakage in the iodine filter 20 that adsorbs radioactive iodine is explained. However, the present embodiment is not limited thereto, and the leak testing device 10 for an iodine filter can be similarly used for leak testing of a filter that adsorbs a component other than radioactive iodine.

REFERENCE SIGNS LIST 10 leak testing device for iodine filter
11 flue gas (gas to be treated)
12 duct
13 chamber (container)
14 iodine adsorption unit
15 fluorine-containing-reagent feed unit
16 first fluorine-containing-reagent-concentration measurement unit
17 second fluorine-containing-reagent-concentration measurement unit
20 iodine filter
21 gasket
22 gas introduction hole
23 gas introduction unit
23a coupling unit
24 iodine adsorbing material
25 filter body
26 back plate
30 fluorine-containing reagent
31 fluorine-containing reagent reservoir
32 fluorine-containing-reagent feed pipe
32a nozzle hole
33 sample gas
41 first gas sampling tube
42 first gas chromatograph
43 second gas sampling tube
44 second gas chromatograph
45 control device

The invention claimed is

1. A leak testing method for detecting a leakage, the leak testing method comprising:
feeding a fluorine-containing reagent that does not contain chlorine to an upstream side of an iodine filter, the iodine filter removing radioactive iodine contained in gas to be treated by an iodine adsorbing material, in a duct or a chamber to which the gas to be treated containing radioactive iodine discharged from a nuclear facility is fed;
measuring a concentration of the fluorine-containing reagent on the upstream side and a downstream side of the iodine filter; and
obtaining a leak rate of a fluorine-containing reagent passing through the iodine filter.

2. The leak testing method according to claim 1, wherein a compound that contains fluorine and carbon, and further contains at least one of hydrogen, oxygen, and nitrogen, but does not contain chlorine is used as the fluorine-containing reagent.

3. The leak testing method according to claim 1, wherein the fluorine-containing reagent has a boiling point equal to or higher than 70 C under atmospheric pressure.

4. A leak testing device comprising:
an iodine filter provided in a duct or a chamber to which gas to be treated containing radioactive iodine is fed, the iodine filter including an iodine adsorbing material that adsorbs radioactive iodine contained in the gas to be treated;

a fluorine-containing-reagent feed unit provided in the duct or the chamber to feed a fluorine-containing reagent that does not contain chlorine into the duct or the chamber; and a fluorine-containing-reagent-concentration measurement unit provided on an upstream side and a downstream side of the iodine filter to measure a concentration of the fluorine-containing reagent.

5. The leak testing device according to claim 4, wherein the fluorine-containing reagent is a compound that contains fluorine and carbon, and further contains at least one of hydrogen, oxygen, and nitrogen, but does not contain chlorine.

6. The leak testing device according to claim 4, wherein the fluorine-containing reagent has a boiling point equal to or higher than 70 C under atmospheric pressure.

7. The leak testing device according to claim 4, wherein the gas to be treated is flue gas discharged from a nuclear facility.

* * * * *